United States Patent
Jonsson et al.

(10) Patent No.: US 12,096,277 B2
(45) Date of Patent: Sep. 17, 2024

(54) METHOD AND ARRANGEMENTS FOR DESIRED BUFFER SIZE TARGET TIME

(71) Applicant: Telefonaktiebolaget LM Ericsson (publ), Stockholm (SE)

(72) Inventors: Anders Jonsson, Täby (SE); Elena Myhre, Järfälla (SE); Filip Barac, Huddinge (SE); Martin Skarve, Enebyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 424 days.

(21) Appl. No.: 17/426,250

(22) PCT Filed: Feb. 17, 2020

(86) PCT No.: PCT/SE2020/050171
§ 371 (c)(1),
(2) Date: Jul. 28, 2021

(87) PCT Pub. No.: WO2020/167242
PCT Pub. Date: Aug. 20, 2020

(65) Prior Publication Data
US 2022/0394554 A1 Dec. 8, 2022

Related U.S. Application Data
(60) Provisional application No. 62/806,267, filed on Feb. 15, 2019.

(51) Int. Cl.
*H04W 28/10* (2009.01)
*H04W 28/02* (2009.01)
(52) U.S. Cl.
CPC ....... *H04W 28/10* (2013.01); *H04W 28/0268* (2013.01); *H04W 28/0278* (2013.01)

(58) Field of Classification Search
CPC .............. H04L 47/30; H04W 28/0268; H04W 28/0278; H04W 28/10; H04W 28/14
(Continued)

(56) References Cited

U.S. PATENT DOCUMENTS 9,525,641 B1 * 12/2016 Greene ............ H04N 21/25841
2003/0117964 A1 * 6/2003 Chen ................... H04W 72/543
370/468
(Continued)

FOREIGN PATENT DOCUMENTS

EP 3014824 B1 8/2017
WO 2014207494 A1 12/2014

OTHER PUBLICATIONS

International Search Report and Written Opinion dated Apr. 14, 2020 for International Application No. PCT/SE2020/050171 filed Feb. 17, 2020, consisting of 12-pages.
(Continued)

*Primary Examiner* — Robert J Lopata
(74) *Attorney, Agent, or Firm* — Weisberg I.P. Law, P.A.

(57) ABSTRACT

The present disclosure relates to the field of wireless communication, and in particular to a method and arrangement for improving flow control interaction in a low latency distributed radio access network, RAN, including an upper layer RAN node and at least one lower layer RAN node. The method includes determining a Packet Data Convergence Protocol, PDCP, Protocol Data Unit, PDU, buffer dwell time target, BDTT, and providing the BDTT to the upper layer RAN node and/or the lower layer RAN node.

17 Claims, 4 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2016/0179412 | A1* | 6/2016 | Camp | G06F 12/0261 |
| | | | | 711/103 |
| 2016/0299697 | A1* | 10/2016 | Chen | G06F 3/0611 |
| 2017/0171085 | A1* | 6/2017 | Li | H04L 43/0817 |
| 2017/0279725 | A1* | 9/2017 | Lee | H04L 47/193 |
| 2019/0087259 | A1* | 3/2019 | Saxena | G06F 11/3442 |
| 2020/0296749 | A1* | 9/2020 | Freda | H04W 72/20 |

OTHER PUBLICATIONS

3GPP TS 23.501 V15.4.0; 3rd Generation Partnership Project; Technical Specification Group Services and System Aspects; System Architecture for the 5G System; Stage 2 (Release 15), Dec. 2018, consisting of 236-pages.

ETSI TS 138 321 V15.4.0; 5G; NR; Medium Access Control (MAC) protocol specification (3GPP TS 38.321 version 15.4.0 Release 15), Apr. 2019, consisting of 79-pages.

ETSI TS 138 401 V15.4.0; 5G; NG-RAN; Architecture description (3GPP TS 38.401 version 15.4.0 Release 15), Apr. 2019, consisting of 41-pages.

ETSI TS 138 423 V15.2.0; 5G; NG-RAN; Xn Application Protocol (XnAP) (3GPP TS 38.423 version 15.2.0 Release 15), Apr. 2019, consisting of 275-pages.

ETSI TS 138 425 V15.4.0; 5G; NG-RAN; NR user plane protocol (3GPP TS 38.425 version 15.4.0 Release 15), Apr. 2019, consisting of 25-pages.

ETSI TS 138 473 V15.4.1; 5G; NG-RAN; F1 Application protocol (F1AP) (3GPP TS 38.473 version 15.4.1 Release 15), Apr. 2019, consisting of 192-pages.

Gao Yin et al.; General Architecture of Centralized Unit and Distributed Unit for New Radio; ZTE Communications; Jun. 2018 vol. 16, No. 2, consisting of 9-pages.

3GPP TSG RAN WG3 Meeting #97bis R3-173670; Title: Discussion on F1-U flow control enhancement; Agenda Item: 10.10.2.5; Source: ZTE, China Unicom, China Telecom; Document for: Discussion and Approval; Date and Location: Oct. 9-13, 2017, Prague, Czech Republic, consisting of 3-pages.

3GPP TSG-RAN WG3 Meeting #101 R3-185071; Title: (TP for NR BL CR for TS 38.425) Correction for the handover Issues in a separated CP/UP deployment; Agenda Item: 31.3.4.10; Source: Intel Corporation; Document for: Other; Date and Location: Mar. 20-24, 2018, Gothenburg, Sweden, consisting of 7-pages.

3GPP TSG RAN WG3 Meeting #103bis R3-191784; Title: Making the DBS useful for Dual Connectivity; Agenda Item: 9.3.13; Source: Ericsson; Document for: Discussion and agreement; Date and Location: Apr. 8-12, 2019, Xi'an, P.R. China, consisting of 5-pages.

* cited by examiner

FIG. 5

METHOD AND ARRANGEMENTS FOR DESIRED BUFFER SIZE TARGET TIME

TECHNICAL FIELD

The present disclosure relates to the field of wireless communication, and in particular to a method, a non-transitory computer-readable storage medium, and an arrangement for improving flow control interaction in a low latency distributed radio access network, RAN comprising an upper layer RAN node and at least one lower layer RAN node.

BACKGROUND

As smart phones and other portable devices increasingly become ubiquitous and data usage increases, higher bandwidth capability is required in order to address the increased demand. Wireless communications systems (such as 5G and LTE Advanced Pro) are therefore required to provide increased bandwidth and reduced latencies compared to current system. High date rate, low latency, mass devices connection and low power consumption are aspects that needs to be balanced in any connectivity scenario.

Figure 1:
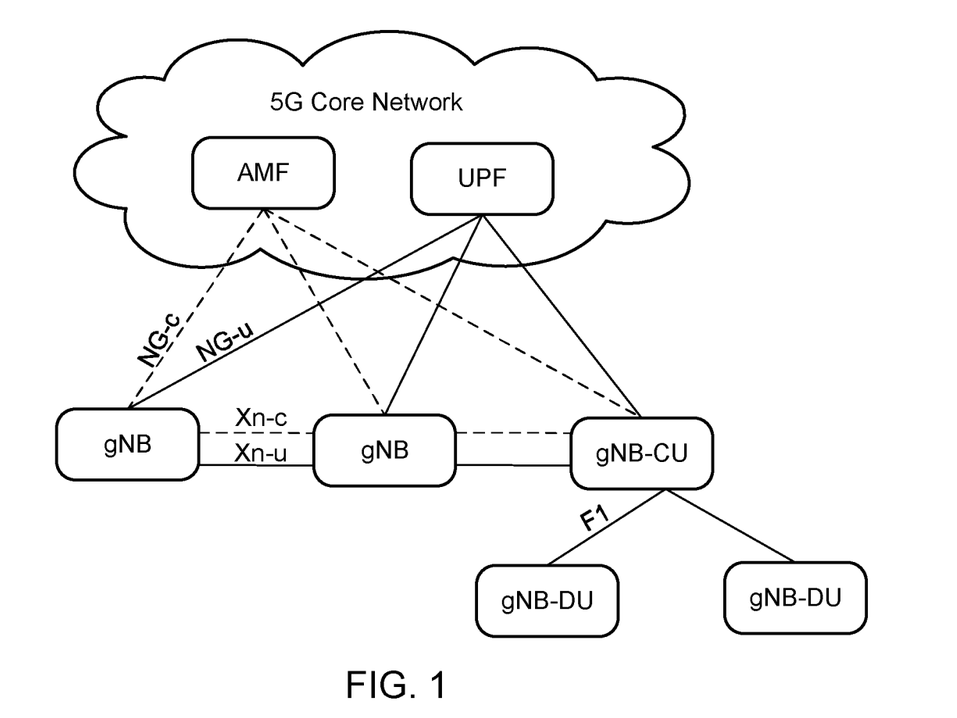
FIG. 1 is a schematic block diagram representation of a radio access network architecture.

FIG. 1 discloses an overall architecture for radio-access network interfaces of a next generation radio access network (NG-RAN). The NG-RAN consists of a set of next generation node Bs, gNBs, connected to a 5G core network (5GC) through an NG interface. A gNB can support FDD mode, TDD mode or dual mode operation. The gNBs are interconnected through the Xn interface. The gNB is responsible for all radio-related functions in one or several cells, e.g., radio resource management, admission control, connection establishment, routing of user-plane data and control plane information, and Quality of Service (QoS) flow management. The gNB is a logical node and is commonly implemented as a three-sector site, where a base station is handling transmission in three cells. As illustrated in FIG. 1, a gNB may be split into two parts, a central unit (gNB-CU), and one or more distributed units (gNB-DU). The gNB-CU and gNB-DU are connected via the F1 logical interface. One gNB-DU is connected to only one gNB-CU.

NG, Xn and F1 are logical interfaces. For NG-RAN, the NG and Xn-C interfaces for a gNB consisting of a gNB-CU and gNB-DUs, terminate in the gNB-CU. For EN-DC (Evolved-Universal Terrestrial Radio Access-New Radio Dual Connectivity), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport and signalling transport. In NG-Flex configuration, each gNB is connected to an Access and Mobility Management Function (AMF) within an AMF Region.

For a device, e.g., a user equipment (UE), to communicate, at least one connection between the device and the network is required. As a baseline, in a single connectivity (SC) scenario, the device is connected to one cell handling all the uplink as well as the downlink transmissions. All data flows, user data as well as RRC signalling, are handled in the single cell. However, in some scenarios, there may be benefits to connect a device to the network through multiple cells, e.g., using a first RAN and a second RAN. The scenario of a device connected to two cells is known as dual connectivity (DC). In an LTE-NR dual connectivity scenario illustrated in FIG. 2, an LTE-based master cell handles control-plane and potentially user-plane signalling, while the NR-based secondary cell handles user plane only, boosting the data rates. Dual connectivity between NR and NR is also being considered. Multi-connectivity scenarios, wherein a device is connected to more than two cells, may also provide benefits.

In any of the above-mentioned single, dual- or multi-connectivity scenarios data to the UE can be sent either between Distributed Units (gNB-DU/DU) or connected to a Controlling Unit (gNB-CU/CU). The flow of data between these nodes is controlled by a function commonly known as Flow Control (FC). When functioning as intended, FC keeps the buffer level in the DU's at what is deemed to be an appropriate level. This level is usually big enough to ensure that there is sufficient data buffered to fully utilize the available radio bandwidth to the UE while avoiding excessively large buffers since this will impact the latency through a longer dwell time in the buffer especially impacting performance during user data split in DC mode. In order for the DU to indicate how much data it can send to the UE, the DU sends feedback to the CU via a message Downlink Data Delivery Status (DDDS). The feedback contains elements used in an FC algorithm. Such elements comprise Desired Buffer Size (DBS), Desired Data Rate (DDR) and feedback IE's for RLC Acknowledge Mode (AM) and Unacknowledged Mode (UM) of which data has been transmitted by RLC to lower layers (Highest transmitted NR PDCP Sequence Number) and for RLC AM additionally also which data that has been sent to and acknowledged by the UE (Highest successfully delivered NR PDCP Sequence Number). The DBS mandates how much data the CU can send as outlined. In addition to the DBS, the DDR can also be used as input to FC in a similar way as DBS.

From this follows that the buffer level will not only be dependent on how well the DU gauges its ability to send data, but also on a buffer dwell time (BDT) in the DU. Such buffer dwell time is currently not targeted in the Packet Data Convergence Protocol (PDCP) PDU with the consequence that a UE's reordering timer may expire causing throughput degradations as well as loss of higher layer control data. The UE can handle a certain level of out of order delivery by means of a reordering procedure controlled by the reordering timer in the UE. However, if the data that arrives from each leg in a DC scenario is not sufficiently well adjusted in time, the UE's reordering timer may expire and data may be delivered to higher layer out of order leading to throughput degradations or loss of higher layer control data.

Thus, there exists a need to have a mechanism that targets also buffer dwell time (BDT) in the various connectivity scenarios.

SUMMARY

It is therefore an object of the present disclosure to provide a method, a non-transitory computer-readable storage medium, an arrangement, and a wireless telecommunications network, which alleviates all or at least some of the above-discussed drawbacks of presently known solutions.

This and other objects are achieved by means of a method, a non-transitory computer-readable storage medium, and an arrangement, as defined in the appended claims. The term exemplary is in the present context to be understood as serving as an instance, example or illustration.

According to a first aspect of the present disclosure, there is provided a method for improving flow control interaction in a distributed radio access network (RAN), comprising an upper layer RAN node and at least one lower layer RAN node. The method comprises determining a Packet Data Convergence Protocol, PDCP, Protocol Data Unit, PDU, buffer dwell time target, BDTT and providing the BDTT to the upper layer RAN node and/or the lower layer RAN node.

This disclosure outlines a method to enable improvement of a Desired Buffer Size, DBS, to improve upper layer RAN node and lower layer RAN node flow control interaction by defining a Buffer Dwell Target Time, BDTT, that the lower layer RAN node should target when assessing what DBS value to send in a Downlink Data Delivery Status, DDDS, message sent as feedback information to the upper layer RAN node.

The functionality will be especially beneficial in 5G scenarios involving multiple nodes produced by different vendors since different vendors will have different methods and algorithms to determine which DBS value to send.

In some exemplary embodiments the upper layer RAN node is a RAN control unit, CU, and the at least one lower layer network node is a RAN distribution unit, DU.

Since the 3GPP standard does not mandate what BDTT the DU shall use to calculated a Desired Buffer Size, DBS, in the DU, a person skilled in the art realizes that the signalled DBS value will not be the same even with identical radio and congestion conditions unless the same BDTT is used as a base to calculate the DBS.

In some exemplary embodiments, the BDTT to be used is signalled to the DU from the CU through X2, Xn or F1 control signalling, conveyed through in-band signalling in a DL user plane data frame, or simply defined in the standard.

The exemplary embodiments described herein are extendable to all the cases where flow control, FC, is applied, e.g., cases where the node hosting the Packet Data Convergence Protocol, PDCP, is an eNB, or a gNB-CU, while the node hosting lower layers could be an eNB or a gNB-DU. It should be noted that an eNB may also be split in a node hosting user plane function, i.e. an eNB-CU-UP and a node hosting control plane functions, i.e. an eNB-CU-CP. The eNB may also have an eNB-DU, in which case the NR user plane protocol can be used also between the eNB-CU (eNB-CU-UP) and eNB-DU. Therefore, the methods herein also apply to the interfaces connecting an eNB-CU to an eNB-DU.

In a deployment where the CU is split into a user plane part (CU-UP) and a control plane part (CU-CP) connected over a standard interface, e.g., the E1 interface, the BDTT can be sent to the CU-UP from the CU-CP over the E1 interface. Meanwhile, the DBTT to be used in the DU can be conveyed to the DU over the F1 interface, e.g., F1-C.

Based on QoS requirements, the CU can decide which BDTT to use for each data radio bearer (DRB) and configure this in the DU during the bearer setup procedures over the E1 and F1 interfaces. The BDTT to be used may also be exchanged over the external interfaces (such as X2 and/or Xn) so that the CU-CP or the CU-UP can decide which BDTT to use in case of dual-connectivity between different nodes (eNB and/or NG-RAN nodes).

Further, according to a second aspect of the present disclosure, there is provided a non-transitory computer-readable storage medium storing one or more programs configured to be executed by one or more processors of a network function, the one or more programs comprising instructions for performing the method according to any one of the embodiments disclosed herein. With this aspect of the invention, similar advantages and preferred features are present as in the previously discussed first aspect of the disclosure.

Still further, according to a third aspect of the present disclosure, there is provided an arrangement for improving flow control interaction in a distributed radio access network, RAN, comprising an upper layer RAN node and at least one lower layer RAN node, the arrangement comprising at least one communication interface; at least one memory; and at least one processor; wherein the processor is configured to execute instructions stored in the memory to perform the steps of determining a Packet Data Convergence Protocol, PDCP, Protocol Data Unit, PDU, buffer dwell time target, BDTT; and providing the BDTT to the upper layer RAN node and/or the lower layer RAN node.

Further embodiments of the disclosure are defined in the dependent embodiments. It should be emphasized that the term "comprises/comprising" when used in this specification is taken to specify the presence of stated features, integers, steps, or components. It does not preclude the presence or addition of one or more other features, integers, steps, components, or groups thereof.

Advantages of the above disclosed aspects is that any mismatch in the BDTT used in the algorithms in the DU's used to determine the DBS can be aligned. Thus, this disclosure outlines a method to enable improvement of a Desired Buffer Size, DBS, to improve upper layer RAN node and lower layer RAN node flow control interaction by defining a Buffer Dwell Target Time, BDTT, that the lower layer RAN node should target when assessing what DBS value to send in a Downlink Data Delivery Status, DDDS, message sent as feedback information to the upper layer RAN node.

The above mentioned mismatch is not the result of erroneous behaviour by either node, but a consequence from variations/mismatch in the BDTT between nodes, which is highly likely as long as this remains undefined in the standard. Consequently, the functionality outlined in this invention disclosure will be especially beneficial in 5G NR multivendor scenarios involving nodes from different vendors since different vendors currently most likely target different BDTT's.

These and other features and advantages of the present invention will in the following be further clarified with reference to the embodiments described hereinafter. In the following disclosure, a description will be provided for a pure 5G solution, but all included ideas are applicable also for an EN-DC solution (eNB-gNB) as well as an LTE solution.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs).

It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 is a schematic block diagram representation of a radio access network architecture of a next generation radio access network (NG-RAN). The NG-RAN consists of a set of next generation Node Bs, gNBs, connected to a 5G core network (5GC) through the NG interface. A gNB can support FDD mode, TDD mode or dual mode operation. The gNBs are interconnected through the Xn interface. The gNB is responsible for all radio-related functions in one or several cells, e.g., radio resource management, admission control, connection establishment, routing of user-plane data and control plane information, and QoS flow management. NG, Xn and F1 are logical interfaces. For NG-RAN, the NG and Xn-C interfaces for a gNB consisting of a gNB-CU and gNB-DUs, terminate in the gNB-CU. For EN-DC (Evolved-Universal Terrestrial Radio Access-New Radio Dual Connectivity), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport and signalling transport. In NG-Flex configuration, each gNB is connected to all AMFs within an AMF Region.

For a device, e.g., a user equipment (UE), to communicate, at least one connection between the device and the network is required. As a baseline, in a single connectivity (SC) scenario, the device is connected to one cell handling all the uplink as well as the downlink transmissions. All data flows, user data as well as RRC signalling, are handled in the single cell. However, in some scenarios, there may be benefits to connect a device to the network through multiple cells, e.g., using a first RAN and a second RAN. The scenario of a device connected to two cells is known as dual connectivity (DC).

Figure 2:
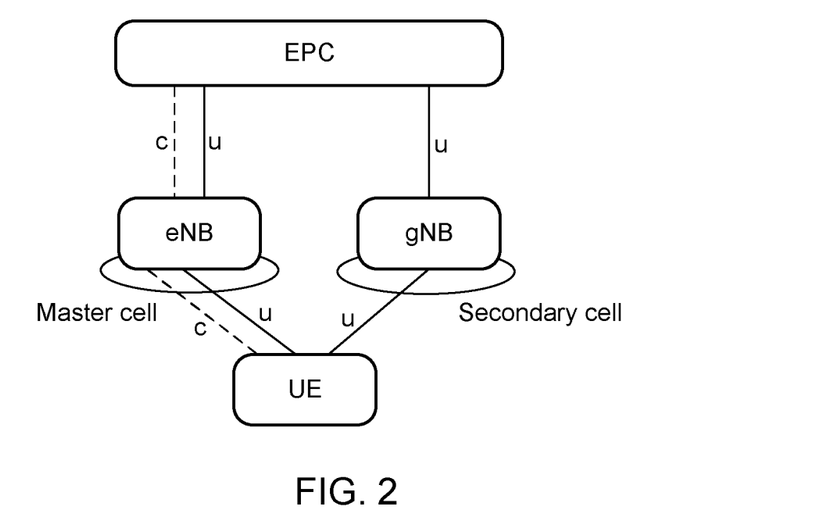
FIG. 2 is a schematic block diagram representation of a LTE-NR dual connectivity scenario.

FIG. 2 is a schematic block diagram representation of a LTE-NR dual connectivity scenario. The scenario of a device connected to two cells is known as dual connectivity (DC). In an LTE-NR dual connectivity scenario illustrated in FIG. 2, an LTE-based master cell handles control-plane and potentially user-plane signalling, while the NR-based secondary cell handles user plane only, boosting the data rates. Dual connectivity between NR and NR is also being considered. Multi-connectivity scenarios, wherein a device is connected to more than two cells, may also provide benefits.

In any of the above-mentioned single, dual- or multi-connectivity scenarios data to the UE can be sent either between Distributed Units (gNB-DU/DU) or connected to a Controlling Unit (gNB-CU/CU). The flow of data between these nodes is controlled by a function commonly known as Flow Control (FC). When functioning as intended, FC keeps the buffer level in the DU's at what is deemed to be an appropriate level. This level is usually big enough to ensure that there is sufficient data buffered to fully utilize the available radio bandwidth to the UE while avoiding excessively large buffers since this will impact the latency through a longer dwell time in the buffer especially impacting performance during user data split in DC mode. In order for the DU to indicate how much data it can send to the UE, the DU sends feedback to the CU via a message Downlink Data Delivery Status (DDDS). The feedback contains elements used in an FC algorithm. Such elements comprise Desired Buffer Size (DBS), Desired Data Rate (DDR) and feedback IE's for RLC Acknowledge Mode (AM) and Unacknowledged Mode (UM) of which data has been transmitted by RLC to lower layers (Highest transmitted NR PDCP Sequence Number) and for RLC AM additionally also which data that has be sent to and acknowledged by the UE (Highest successfully delivered NR PDCP Sequence Number). The DBS mandates how much data the CU can send as outlined. In addition to the DBS, the DDR can also be used as input to FC in a similar way as DBS.

From this follows that the buffer level will not only be dependent on how well the DU gauges its ability to send data, but also on a buffer dwell time (BDT) in the DU. Such buffer dwell time (BDT) is currently not targeted in the Packet Data Convergence Protocol (PDCP) PDU with the consequence that a UE's reordering timer may expire causing throughput degradations as well as loss of higher layer control data. The UE can handle a certain level of out of order delivery by means of a reordering procedure controlled by the reordering timer in the UE. However, if the data that arrives from each leg in a DC scenario is not sufficiently well adjusted in time, the UE's reordering timer may expire and data may be delivered to higher layer out of order leading to throughput degradations or loss of higher layer control data.

Buffer dwell time, BDT, target, henceforth referred to as the BDTT, is undefined in the standard and if different DU's target different BDTT then the data sent to the UE will arrive out of order. Consequently, as long as the BDTT remains undefined in the standard, there is a risk that different vendors target different BDTT times leading to interoperability problems in multi-vendor scenarios.

Thus, there exists a need to have a mechanism that targets also BDT in the various connectivity scenarios.

Figure 3:
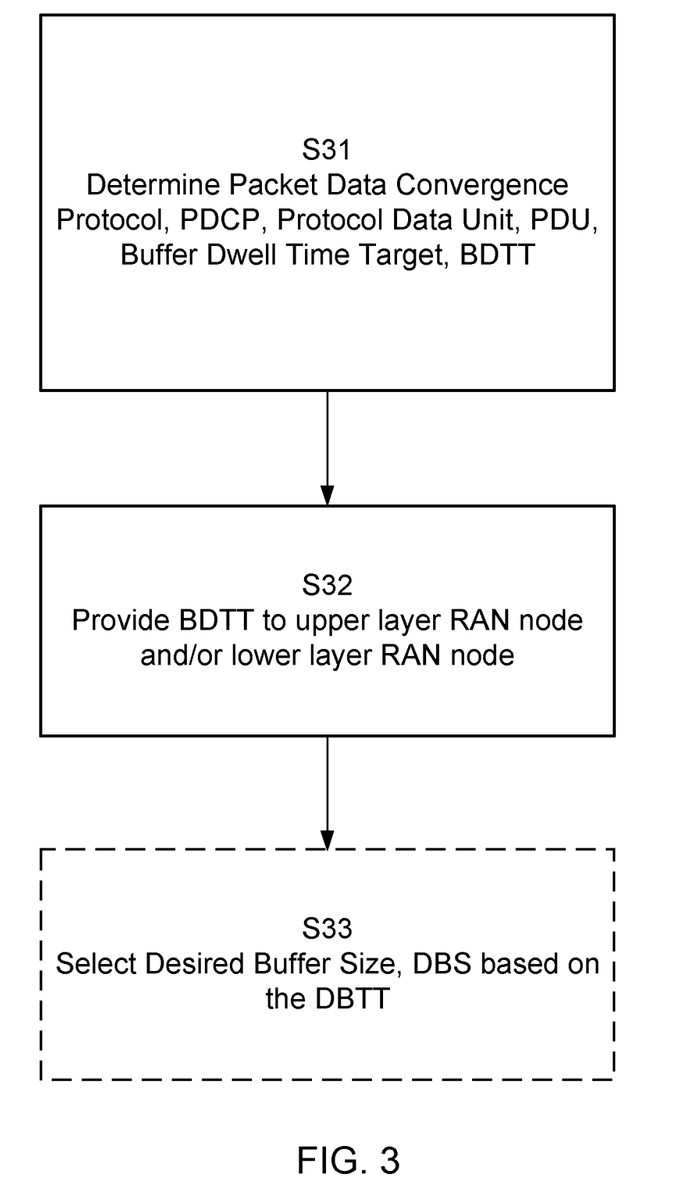
FIG. 3 is a flow chart representation of a method for improving flow control interaction in a distributed radio access network (RAN) interface.

FIG. 3 is a flow chart representation of a method for improving flow control interaction in a distributed radio access network (RAN) interface. In its most general form, the method comprises determining S31 a Packet Data Convergence Protocol, PDCP, Protocol Data Unit, PDU, buffer dwell time target, BDTT; and providing S32 the BDTT to an upper layer RAN node and/or to at least one lower layer RAN node comprised in the distributed RAN. Optionally, the method further comprises selecting a Desired Buffer Size, DBS, in the lower layer RAN node based on the DBTT and applying the selected DBS in data delivery to/from connected UE.

Figure 4:
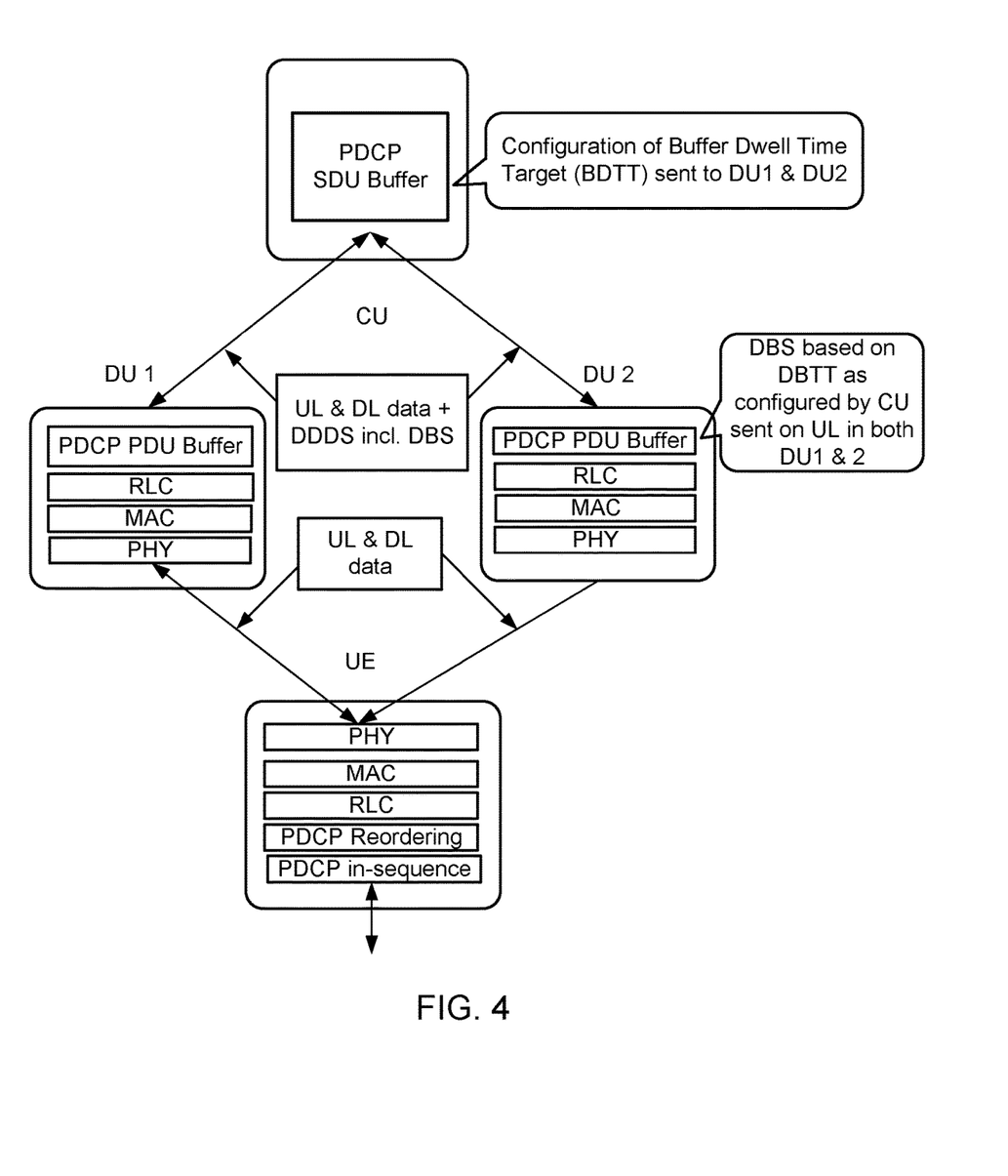
FIG. 4 is a schematic block diagram representation of a split gNB architecture.

FIG. 4 illustrates a schematic block diagram representation of a split gNB architecture. In the example of FIG. 4, the upper layer RAN node is a RAN control unit, CU, e.g., an eNB-CU or a gNB-CU, and the at least one lower layer RAN node is a RAN distribution unit, DU, e.g., an eNB-DU or an gNB-DU. In the illustration of FIG. 4, two RAN-DU:s are illustrated and according to example embodiments, the distributed RAN comprises at least two RAN DU:s, whereof at least one of the RAN DU:s is an gNB-DU.

Note that the CU may be one unit or may be both logically and physically split into two separate functions that handle user plane and control data separately. It should also be note that the solution outlined in this invention disclosure is also applicable in a scenario where a gNB is connected to a legacy LTE eNB or when two gNB DU's are located in two physically separated nodes.

The BDTT in the DU can from the CU be conveyed to the DU either through control signalling, user plane in-band signalling or simply defined to a fixed value in the standard. Thus, according to example embodiments, providing the BDTT comprises providing the BDTT from the upper layer RAN node through X2, Xn or F1 interface control signalling; providing the BDTT through X2, Xn or F1 user plane in-band signalling in a downlink, DL, user plane data frame; or providing a predefined BDTT in the configuration of the RAN.

Since the 3GPP standard does not mandate what BDTT the DU shall use to calculated a Desired Buffer Size, DBS, in the DU, a person skilled in the art realizes that the signalled DBS value will not be the same even with identical radio and congestion conditions unless the same BDTT is used as a base to calculate the DBS.

According to exemplary embodiments, the RAN CU is split into a control unit user plane, CU-UP, and a control unit control plane, CU-CP, and connected over an E1 interface, the BDTT is communicated between the CU-UP and the CU-CP over the E1 interface. In some example embodiments, the DBTT is provided from the CU to the at least one DU over the F1 interface. The BDTT may be determined based on QoS requirements and may also differentiated based on these requirements.

The method for improving flow control interaction in a distributed radio access network, RAN, may at least in part be performed in a cloud based host computer, e.g., determining the DBTT in a cloud based host computer and provided to the upper layer RAN node from the host computer. The method may be especially beneficial in a cloud implementation where the network nodes are physically separated from each other. For example, in a virtualized environment the DU nodes serving a UE may be from different vendors.

Alternatively, determining the DBTT may be performed in the upper layer RAN node, whereupon the upper layer RAN node is configured to provide the DBTT from the upper layer RAN node to the at least one lower layer RAN node, e.g., to send the BDTT to the relevant distribution units DU1 and DU2 as indicated in FIG. 4.

The solution outlined in this invention disclosure outlines a method to improve the definition of the DBS to improve CU and DU flow control interaction by defining what BDTT the DU should target when assessing what DBS value to send in the DDDS feedback information to the CU.

The preferred embodiment is to signal the BDTT to be used in the DU from the CU through X2, Xn or F1 control signalling. The BDTT can be defined as a new information element (IE) in 3GPP specifications. The Buffer Dwell Time Target IE is determined by the gNB-CU and sent to the gNB-DU, based on which the gNB-DU shall set the Desired Buffer Size value.

| IE/Group Name | Presence | Range | IE type and reference | Semantics description |
|---|---|---|---|---|
| Buffer Dwell Time Target | O | | INTEGER (1 . . . 1000) | Defines the target dwell time (in milliseconds) to calculate the desired buffer size value. |

The BDTT can be included in the F1AP and XnAP specifications as described below.

The BDTT can be included as a new Information Element (IE) in the UE CONTEXT SETUP REQUEST and UE CONTEXT MODIFICATION REQUEST messages. The non-limiting example below shows the inclusion of BDTT into the UE CONTEXT MODIFICATION REQUEST. This message is sent by the gNB-CU to provide UE Context information changes to the gNB-DU. Direction: gNB-CU to gNB-DU.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| SpCell ID | O | | NR CGI 9.3.1.12 | Special Cell as defined in TS 38.321 [16]. For handover case, this IE shall be considered as target cell. | YES | ignore |
| ServCellIndex | O | | INTEGER (0 . . . 31) | | YES | reject |
| SpCell UL Configured | O | | Cell UL Configured 9.3.1.33 | | YES | ignore |
| DRX Cycle | O | | DRX Cycle 9.3.1.24 | | YES | ignore |
| CU to DU RRC Information | O | | 9.3.1.25 | | YES | reject |
| Transmission Stop Indicator | O | | 9.3.1.11 | | YES | ignore |

-continued

| IE/Group Name | Presence | Range | IE type and reference | Semantics description | Criticality | Assigned Criticality |
|---|---|---|---|---|---|---|
| Resource Coordination Transfer Container | O | | OCTET STRING | Includes the MeNB Resource Coordination Information IE as defined in subclause 9.2.116 of TS 36.423 [9]. | YES | ignore |
| RRC Reconfiguration Complete Indicator | O | | 9.3.1.30 | | YES | ignore |
| RRC-Container | O | | 9.3.1.6 | Includes the RRCConnectionReconfiguration message as defined in TS 38.331 [8], encapsulated in a PDCP PDU. | YES | reject |
| SCell To Be Setup List | | 0 . . . 1 | | | YES | ignore |
| >SCell to Be Setup Item IEs | | 1 . . . <maxnoofSCells> | | | EACH | ignore |
| >>SCell ID | M | | NR CGI 9.3.1.12 | SCell Identifier in gNB | | |
| >>SCellIndex | M | | INTEGER (1 . . . 31) | | — | |
| >>SCell UL configured | O | | Cell UL Configured 9.3.1.33 | | | |
| >>servingCellMO | O | | INTEGER (1 . . . 64) | | YES | ignore |
| SCell To Be Removed List | | 0 . . . 1 | | | YES | ignore |
| >SCell to Be Removed Item IEs | | 1 . . . <maxnoofSCells> | | | EACH | ignore |
| >>SCell ID | M | | NR CGI 9.3.1.12 | SCell Identifier in gNB | | |
| SRB to Be Setup List | | 0 . . . 1 | | | YES | reject |
| >SRB to Be Setup Item IEs | | 1 . . . <maxnoofSRBs> | | | EACH | reject |
| >>SRB ID | M | | 9.3.1.7 | | — | |
| >>Duplication Indication | O | | ENUMERATED (true, . . . , false) | | | |
| DRB to Be Setup List | | 0 . . . 1 | | | YES | reject |
| >DRB to Be Setup Item IEs | | 1 . . . <maxnoofDRBs> | | | EACH | reject |
| >>DRB ID | M | | 9.3.1.8 | | — | |
| >>CHOICE QoS Information | M | | | | — | |
| >>>E-UTRAN QoS | M | | 9.3.1.19 | Shall be used for EN-DC case to convey E-RAB Level QoS Parameters | | |
| >>>DRB Information | | 1 | | Shall be used for NG-RAN cases | YES | ignore |
| >>>>DRB QoS | M | | 9.3.1.45 | | — | |
| >>>>S-NSSAI | M | | 9.3.1.38 | | — | |
| >>>>Notification Control | O | | 9.3.1.56 | | — | |
| >>>>Flows Mapped to DRB Item | | 1 . . . <maxnoofQoSFlows> | | | — | |
| >>>>>QoS Flow Identifier | M | | 9.3.1.63 | | — | |
| >>>>>QoS Flow Level QoS Parameters | M | | 9.3.1.45 | | — | |
| >>>>>QoS Flow Mapping Indication | O | | 9.3.1.72 | | YES | ignore |
| >>UL UP TNL Information to be setup List | | 1 | | | — | |
| >>>UL UP TNL Information to Be Setup Item IEs | | 1 . . . <maxnoofULUPTNLInformation> | | | | |
| >>>>UL UP TNL Information | M | | UP Transport Layer Information 9.3.2.1 | gNB-CU endpoint of the F1 transport bearer. For delivery of UL PDUs. | — | |
| >> RLC Mode | M | | 9.3.1.27 | | — | |
| >>UL Configuration | O | | UL Configuration 9.3.1.31 | Information about UL usage in gNB-DU. | — | |
| >>Duplication Activation | O | | 9.3.1.36 | Information on the initial state of CA based UL PDCP duplication | — | |
| >> DC Based Duplication Configured | O | | ENUMERATED (true, . . . , false) | Indication on whether DC based PDCP duplication is configured or not. If included, it should be set to true. | YES | reject |
| >>DC Based Duplication Activation | O | | Duplication Activation 9.3.1.36 | Information on the initial state of DC based UL PDCP duplication | YES | reject |

-continued

| IE/Group Name | Presence | Range | IE type and reference | Semantics description | Criticality | Assigned Criticality |
|---|---|---|---|---|---|---|
| >>DL PDCP SN length | M | | ENUMERATED (12 bits, 18 bits, . . .) | | YES | ignore |
| >>UL PDCP SN length | O | | ENUMERATED (12 bits, 18 bits, . . .) | | YES | ignore |
| >>Buffer Dwell Time Target | O | | 9.3.1.x | | YES | ignore |
| DRB to Be Modified List | | 0 . . . 1 | | | YES | reject |
| >DRB to Be Modified Item IEs | | 1 . . . <maxnoofDRBs> | | | EACH | reject |
| >>DRB ID | M | | 9.3.1.8 | | — | |
| >>CHOICE QoS Information | O | | | | — | |
| >>>E-UTRAN QoS | M | | 9.3.1.19 | Shall be used for EN-DC case to convey E-RAB Level QoS Parameters | — | |
| >>>DRB Information | | 1 | | Shall be used for NG-RAN cases | YES | ignore |
| >>>>DRB QoS | M | | 9.3.1.45 | | — | |
| >>>>S-NSSAI | M | | 9.3.1.38 | | — | |
| >>>>Notification Control | O | | 9.3.1.56 | | — | |
| >>>>Flows Mapped to DRB Item | | 1 . . . <maxnoofQoSFlows> | | | — | |
| >>>>>QoS Flow Identifier | M | | 9.3.1.63 | | — | |
| >>>>>QoS Flow Level QoS Parameters | M | | 9.3.1.45 | | — | |
| >>UL UP TNL Information to be setup List | | 0 . . . 1 | | | — | |
| >>> UL UP TNL Information to Be Setup Item IEs | | 1 . . . <maxnoofULUPTNLInformation> | | | — | |
| >>>>UL UP TNL Information | M | | UP Transport Layer Information 9.3.2.1 | gNB-CU endpoint of the F1 transport bearer. For delivery of UL PDUs. | — | |
| >>UL Configuration | O | | UL Configuration 9.3.1.31 | Information about UL usage in gNB-DU. | — | |
| >>DL PDCP SN length | O | | ENUMERATED(12 bits, 18 bits, . . .) | | YES | ignore |
| >>UL PDCP SN length | O | | ENUMERATED (12 bits, 18 bits, . . .) | | YES | ignore |
| >>Bearer Type Change | O | | ENUMERATED (true, . . .) | | YES | ignore |
| >> RLC Mode | O | | 9.3.1.27 | | YES | ignore |
| >>Duplication Activation | O | | 9.3.1.36 | Information on the initial state of CA based UL PDCP duplication | YES | reject |
| >>DC Based Duplication Configured | O | | ENUMERATED (true, . . . , false) | Indication on whether DC based PDCP duplication is configured or not. | YES | reject |
| >>DC Based Duplication Activation | O | | 9.3.1.36 | Information on the initial state of DC based UL PDCP duplication | YES | reject |
| >>Buffer Dwell Time Target | O | | 9.3.1.x | | YES | ignore |
| SRB To Be Released List | | 0 . . . 1 | | | YES | reject |
| >SRB To Be Released Item IEs | | 1 . . . <maxnoofSRBs> | | | EACH | reject |
| >>SRB ID | M | | 9.3.1.7 | | | |
| DRB to Be Released List | | 0 . . . 1 | | | YES | reject |
| >DRB to Be Released Item IEs | | 1 . . . <maxnoofDRBs> | | | EACH | reject |
| >>DRB ID | M | | 9.3.1.8 | | — | |
| Inactivity Monitoring Request | O | | ENUMERATED (true, . . .) | | YES | reject |
| RAT-Frequency Priority Information | O | | 9.3.1.34 | | YES | reject |
| DRX configuration indicator | O | | ENUMERATED (release, . . .) | | YES | ignore |
| RLC Failure Indication | O | | 9.3.1.66 | | YES | ignore |
| Uplink TxDirectCurrentList Information | O | | 9.3.1.67 | | YES | ignore |
| GNB-DU Configuration Query | O | | ENUMERATED (true, . . .) | Used to request the gNB-DU to provide its configuration. | YES | reject |
| gNB-DU UE Aggregate Maximum Bit Rate Uplink | O | | Bit Rate 9.3.1.22 | The gNB-DU UE Aggregate Maximum Bit Rate Uplink is to be enforced by the gNB-DU. | YES | ignore |

| IE/Group Name | Presence | Range | IE type and reference | Semantics description | Criticality | Assigned Criticality |
|---|---|---|---|---|---|---|
| Execute Duplication | O | | ENUMERATED (true, . . .) | This IE may be sent only if duplication has been configured for the UE. | YES | ignore |
| RRC Delivery Status Request | O | | ENUMERATED (true, . . .) | Indicates whether RRC DELIVERY REPORT procedure is requested for the RRC message. | YES | ignore |
| Resource Coordination Transfer Information | O | | 9.3.1.73 | | YES | ignore |
| servingCellMO | O | | INTEGER (1 . . . 64) | | YES | ignore |

The BDTT can be included as a new Information Element (IE) in the 'DRBS To Be Modified' and/or 'DRBs To Be Setup' portions of the following XnAP IEs (where applicable):

PDU Session Resource Setup Response Info—Secondary Node (S-Node or SN) terminated, PDU Session Resource Setup Info—Master Node (M-Node or MN) terminated, PDU Session Resource Modification Info—SN terminated, PDU Session Resource Modification Response Info—SN terminated, PDU Session Resource Modification Info—MN terminated, PDU Session Modification Required Info—SN terminated, PDU Session Modification Required Info—MN terminated.

The abovementioned IEs are, in turn, a part of the S-NODE ADDITION REQUEST, S-NODE MODIFICATION REQUEST and S-NODE MODIFICATION REQUIRED messages.

The non-limiting example below shows the inclusion of BDTT into the PDU Session Resource Modification Info—MN terminated.

This IE contains information related to PDU session resource for an NG-RAN MN, also known as M-NG-RAN node, initiated request to modify DRBs configured with an MN terminated bearer option.

| IE/Group Name | Presence | Range | IE type and reference | Semantics description |
|---|---|---|---|---|
| PDU Session Type | M | | 9.2.3.19 | |
| DRBs To Be Setup List | | 0 . . . 1 | | |
| >DRBS to Be Setup Item | | 1 . . . <maxnoof DRBs> | | |
| >>DRB-ID | M | | 9.2.3.33 | |
| >>MN UL PDCP UP TNL Information | M | | UP Transport Parameters 9.2.3.76 | M-NG-RAN node endpoint(s) of a DRB's Xn transport bearer at its PDCP resource. For delivery of UL PDUs. |
| >>RLC Mode | O | | 9.2.3.28 | Indicates the RLC mode to be used in the assisting node. |
| >>DRB QoS | M | | QoS Flow Level QoS Parameters 9.2.3.5 | |
| >>PDCP SN Length | O | | 9.2.3.63 | Indicates the PDCP SN length of the DRB. |
| >>secondary MN UL PDCP UP TNL Information | O | | UP Transport Parameters 9.2.3.76 | M-NG-RAN node endpoint(s) of a DRB's Xn transport bearer at its PDCP resource. For delivery of UL PDUs in case of PDCP duplication. |
| >>Duplication Activation | O | | 9.2.3.71 | Information on the initial state of UL PDCP duplication |
| >>UL Configuration | O | | 9.2.3.75 | Information about UL usage in the S-NG-RAN node. |
| >>PDCP Duplication Configuration | O | | 9.2.3.86 | |
| >>Duplication Activation | O | | 9.2.3.71 | |
| >>QoS Flows Mapped to DRB List | | 1 | | |
| >>>QoS Flows Mapped To DRB Item | | 1 . . . <maxnoof QoSFlows> | | |
| >>>>QoS Flow Identifier | M | | 9.2.3.10 | |

| IE/Group Name | Presence | Range | IE type and reference | Semantics description |
|---|---|---|---|---|
| >>>>QoS Flow Level QoS Parameters | M | | 9.2.3.5 | |
| >>>>QoS Flow Mapping Indication | O | | 9.2.3.79 | |
| >>Buffer Dwell Time Target | O | | 9.2.3.x | |
| DRBs To Be Modified List | | 0 . . . 1 | | |
| >DRBS to Be Modified Item | | 1 . . . <maxnoof DRBs> | | |
| >>DRB ID | M | | 9.2.3.33 | |
| >>MN ULPDCP UP TNL Information | O | | UP Transport Parameters 9.2.3.76 | M-NG-RAN node endpoint(s) of a DRB's Xn transport bearer at its PDCP resource. For delivery of UL PDUs. |
| >>DRB QoS | O | | QoS Flow Level QoS Parameters 9.2.3.5 | |
| >>PDCP SN Length | O | | 9.2.3.63 | Indicates the PDCP SN length of the DRB. |
| >>secondary MN UL PDCP UP TNL Information | O | | UP Transport Parameters 9.2.3.76 | M-NG-RAN node endpoint(s) of a DRB's Xn transport bearer at its PDCP resource. For delivery of UL PDUs in case of PDCP duplication. |
| >>UL Configuration | O | | 9.2.3.75 | Information about UL usage in the S-NG-RAN node. |
| >>QoS Flows Mapped To DRB List | | 0 . . . 1 | | Overwriting the existing QoS Flow List |
| >>>QoS Flows Mapped To DRB Item | | 1 . . . <maxnoof QoS Flows> | | |
| >>>>QoS Flow Identifier | M | | 9.2.3.10 | |
| >>>>MCG requested GBR QoS Flow Information | O | | GBR QoS Flow Information 9.2.3.6 | This IE contains GBR QoS Flow Information necessary for the MCG part. |
| >>>>QoS Flow Mapping Indication | O | | 9.2.3.79 | |
| >>Buffer Dwell Time Target | O | | 9.2.3.x | |
| DRBs To Be Released List | O | | DRB List with Cause 9.2.1.28 | |

An alternative embodiment is to convey the BDTT through in-band signalling in a DL user plane data frame. DL USER DATA (PDU Type 0), BDTT sent over in PDU=0. This frame format is defined to allow the corresponding node to detect lost NR-U packets and is associated with the transfer of a Downlink NR PDCP PDU.

The following shows the respective DL USER DATA frame.

| Bits | | | | | | | | Number of Octets |
|---|---|---|---|---|---|---|---|---|
| 7 | 6 | 5 | 4 | 3 | 2 | 1 | 0 | |
| PDU Type (=0) | | | | Spare | DL Discard Blocks | DL Flush | Report polling | 1 |
| Spare | Buffer Target Time Ind | | | Report Delivered | User data existence flag | Assistance Info. Report Polling Flag | Retransmission flag | 1 |
| NR-U Sequence Number | | | | | | | | 3 |
| DL discard NR PDCP PDU SN | | | | | | | | 0 or 3 |
| DL discard Number of blocks | | | | | | | | 0 or 1 |
| DL discard NR PDCP PDU SN start (first block) | | | | | | | | 0 or 3 |
| Discarded Block size (first block) | | | | | | | | 0 or 1 |
| . . . | | | | | | | | |
| DL discard NR PDCP PDU SN start (last block) | | | | | | | | 0 or 3 |
| Discarded Block size (last block) | | | | | | | | 0 or 1 |
| DL report NR PDCP PDU SN | | | | | | | | 0 or 3 |
| Buffer Dwell Time Target | | | | | | | | 0 or 2 |
| Padding | | | | | | | | 0-3 |

The Buffer Target Time Indication is a parameter that indicates the presence of BDTT. Value range: {0=Buffer Dwell Target Time not present, 1=Buffer Dwell Target Time present}. Field length: 1 bit. The BDTT parameter defines the BDTT in milliseconds to be used in calculating the desired buffer size. Value range: {0 . . . 216-1}. Field length: 2 octets.

The BDTT may also be communicated in a new PDU Type. In this embodiment, a new DL PDU Type=3 is defined. This solution has the advantage that it facilitates a new method to convey information (not only and specifically the DBTT) from the CU in the DL direction to the DU. This embodiment is similar to the UL ASSISTANCE INFORMATION DATA (PDU Type 2). The PDU Type indicates the structure of the NR user plane frame. The field takes the value of the PDU Type it identifies; e.g. "0" for PDU Type 0. The PDU type is in bit 4 to bit 7 in the first octet of the frame.

Value range: {0=DL USER DATA, 1=DL DATA DELIVERY STATUS, 2=ASSISTANCE INFORMATION DATA, 3=DL USER DATA WITH CONFIGURATION INFO, 4-15=reserved for future PDU type extensions}. Field length: 4 bits.

Yet another embodiment is to simply define a BDTT in the standard. A parameter indicates the desired buffer size in bytes for the concerned data radio bearer. The desired buffer size shall be estimated targeting a buffer dwell time of X ms. Value range: {0 . . . 232-1}. Field length: 4 octets.

The functionality outlined in this disclosure will be especially beneficial in 5G scenarios involving multiple nodes produced by different vendors since different vendors will have different methods and algorithms to determine which DBS to send.

The methods described herein are extendable to all the cases where flow control is applied. These could be cases where the node hosting the PDCP protocol is an eNB, or a gNB-CU, while the node hosting lower layers could be an eNB or a gNB-DU. It should be noted that an eNB may also be split in a node hosting user plane function, i.e. an eNB-CU-UP and a node hosting control plane functions, i.e. an eNB-CU-CP. The eNB may also have an eNB-DU, in which case the NR user plane protocol can be used also between the eNB-CU (eNB-CU-UP) and eNB-DU. Therefore, the methods herein also apply to the interfaces connecting an eNB-CU to an eNB-DU.

In a deployment where the CU is split into a user plane part (CU-UP) and a control plane part (CU-CP) connected over a standard interface (i.e., E1 interface as specified in TS 38.46x), the BDTT can be sent to the CU-UP from the CU-CP over the E1 interface.

Meanwhile, the DBTT to be used in the DU can be conveyed to the DU over F1-C (e.g., over the standard F1 interface defined in TS 38.473).

Based on Quality of Service (QoS) requirements, the CU can then decide which BDTT to use for each data radio bearer (DRB) and configure this in the DU during the bearer setup procedures over the E1 and F1 interfaces. The BDTT to be used may also be exchanged over the external interfaces (such as X2 and/or Xn) so that the CU-CP or the CU-UP can decide which BDTT to use in case of dual-connectivity between different nodes (eNB and/or NG-RAN nodes).

Figure 5:
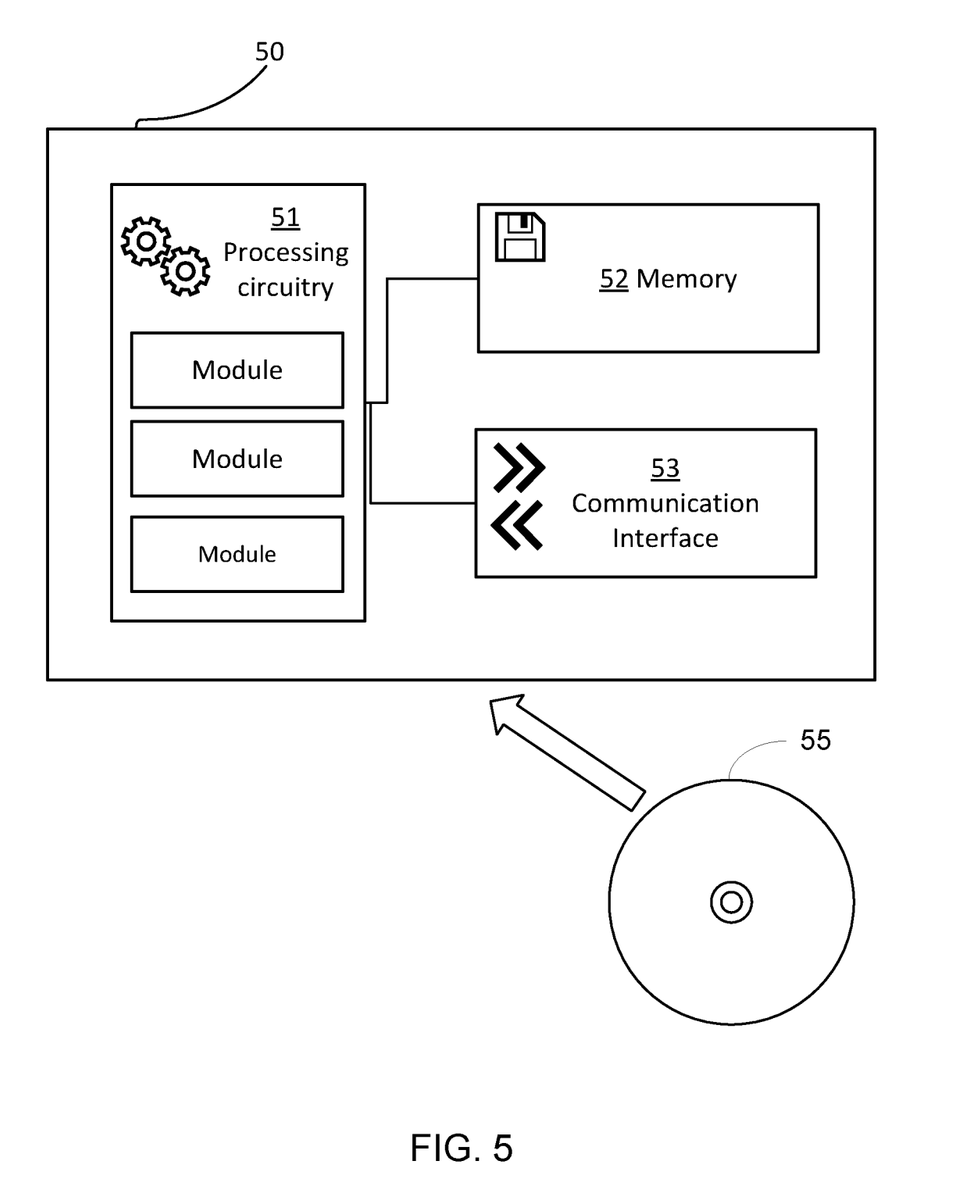
FIG. 5 is a schematic block diagram representation of an arrangement for improving flow control interaction in a distributed radio access network, RAN, according to an embodiment of the present invention.

FIG. 5 is a schematic block diagram representation of an arrangement for improving flow control interaction in a distributed radio access network, RAN. The arrangement comprises at least one communication interface 53, at least one memory 52; and at least one processor 51; wherein the processor is configured to execute instructions stored in the memory to perform the steps of determining a Packet Data Convergence Protocol, PDCP, Protocol Data Unit, PDU, buffer dwell time target, BDTT; and providing the BDTT to the upper layer RAN node and/or the lower layer RAN node.

FIG. 5 further discloses a non-transitory computer-readable storage medium 55 storing one or more programs configured to be executed in a processor of the arrangement for improving flow control interaction in a distributed RAN. The one or more programs comprise instruction for performing a method for improving flow control interaction as disclosed in the detailed description associated with FIG. 3.

User Equipment as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

Although the description is mainly given for a user equipment, in very general forms, it should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a network function, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products.

The processor(s) (associated with the any one of the network components) may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope being defined by the following claims.

The invention claimed is:

1. A method for improving flow control interaction in a distributed radio access network, RAN, comprising an upper layer RAN node and at least one lower layer RAN node, the method comprising:
   determining a Packet Data Convergence Protocol, PDCP, Protocol Data Unit, PDU, buffer dwell time target, BDTT;
   determining the BDTT is performed in the upper layer RAN node;
   providing the BDTT to at least one of the upper layer RAN node and the lower layer RAN node, the BDTT being at least one of differentiated and determined based on Quality of Service, Qos, requirements, providing the BDTT comprising providing the BDTT from the upper layer RAN node to the at least one lower layer RAN node; and
   selecting a Desired Buffer Size, DBS, in the lower layer RAN node based on the BDTT.

2. The method of claim 1, wherein the upper layer RAN node is a RAN control unit, CU, and the at least one lower layer RAN node is a RAN distribution unit, DU.

3. The method of claim 2, wherein the RAN CU is one of an evolved NodeB control unit, eNB-CU and a next generation Node B control unit, gNB-CU.

4. The method of claim 2, wherein the RAN DU is one of an evolved NodeB distribution unit, eNB-DU, and a next generation NodeB distribution unit, gNB-DU.

5. The method of claim 4, comprising at least two RAN DU:s and wherein at least one of the RAN DU:s is a gNB-DU.

6. The method of claim 1, wherein providing the BDTT comprises providing the BDTT from the upper layer RAN node through one of X2, Xn and F1 interface control signalling.

7. The method of claim 1, wherein the BDTT is provided through one of X2, Xn and F1 user plane in-band signalling in a downlink, DL, user plane data frame.

8. The method of claim 1, wherein the BDTT is predefined and provided to the at least one of the upper layer RAN node and the lower layer RAN node in the configuration of the RAN.

9. The method of claim 2, wherein the RAN CU is split into a control unit user plane, CU-UP, and a control unit control plane, CU-CP, and connected over an E1 interface, and wherein the BDTT is communicated between the CU-UP and the CU-CP over the E1 interface.

10. The method of claim 9, wherein the BDTT is provided from the CU to the at least one DU over the F1 interface.

11. The method of claim 1, wherein determining the BDTT is performed in a cloud based host computer.

12. The method of claim 1, further comprising applying the selected DBS in data delivery to/from connected UE.

13. An arrangement for improving flow control interaction in a distributed radio access network, RAN, comprising an upper layer RAN node and at least one lower layer RAN node, the arrangement comprising:
   at least one communication interface;
   at least one memory; and
   at least one processor, the processor being configured to execute instructions stored in the memory to:
      determine a Packet Data Convergence Protocol, PDCP, Protocol Data Unit, PDU, buffer dwell time target, BDTT;
      determine the BDTT is performed in the upper layer RAN node;
      provide the BDTT to at least one of the upper layer RAN node and the lower layer RAN node, the BDTT being at least one of differentiated and determined based on Quality of Service, QoS, requirements, providing the BDTT comprising providing the BDTT from the upper layer RAN node to the at least one lower layer RAN node; and
      select a Desired Buffer Size, DBS, in the lower layer RAN node based on the BDTT.

14. The method of claim 3, wherein the RAN DU is one of an evolved NodeB distribution unit, eNB-DU, and a next generation NodeB distribution unit, gNB-DU.

15. The method of claim 2, wherein providing the BDTT comprises providing the BDTT from the upper layer RAN node through one of X2, Xn and F1 interface control signalling.

16. The method of claim 2, wherein the BDTT is provided through one of X2, Xn and F1 user plane in-band signalling in a downlink, DL, user plane data frame.

17. The method of claim 2, wherein the BDTT is predefined and provided to the at least one of the upper layer RAN node and the lower layer RAN node in the configuration of the RAN.

* * * * *